March 27, 1945. F. H. HAGNER 2,372,487
STAR IDENTIFIER
Filed April 26, 1943 3 Sheets-Sheet 1
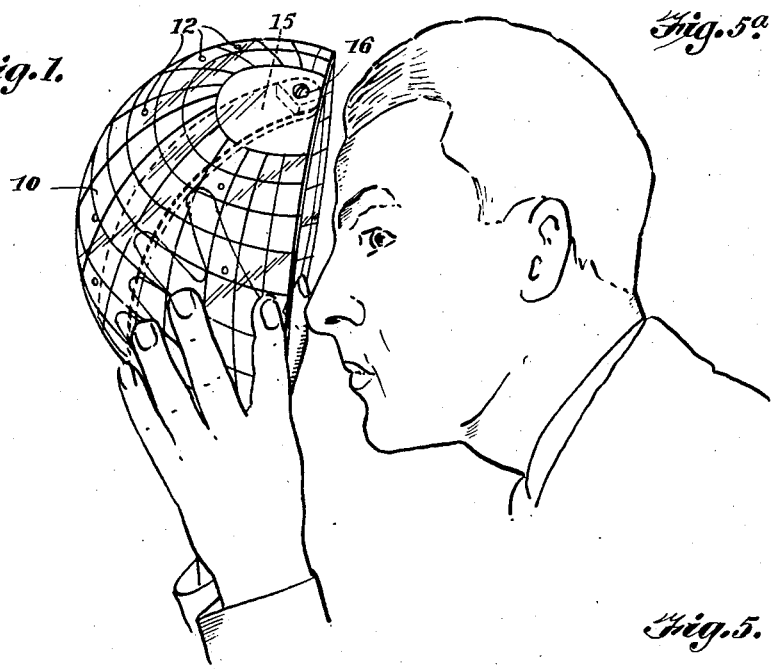
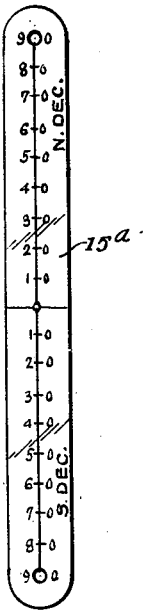
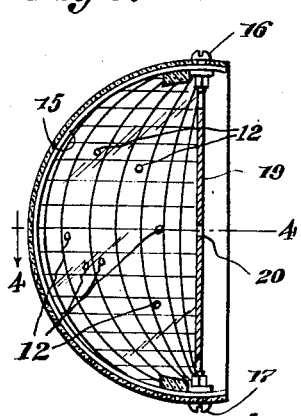
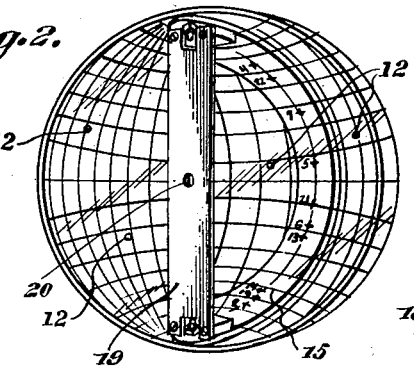
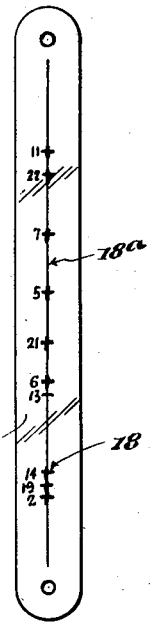
Inventor
FREDERICK H. HAGNER
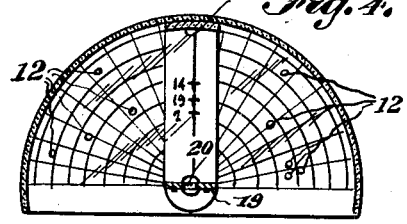
Attorney

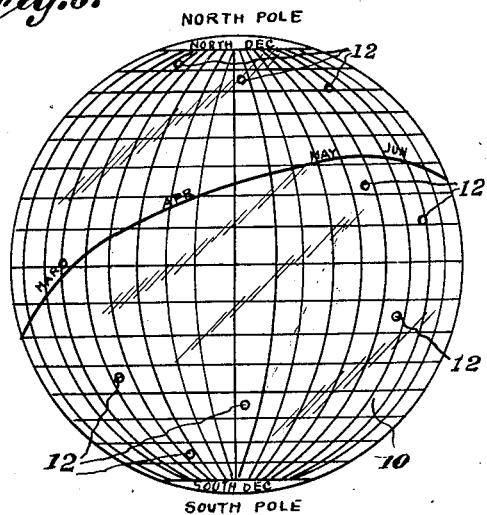
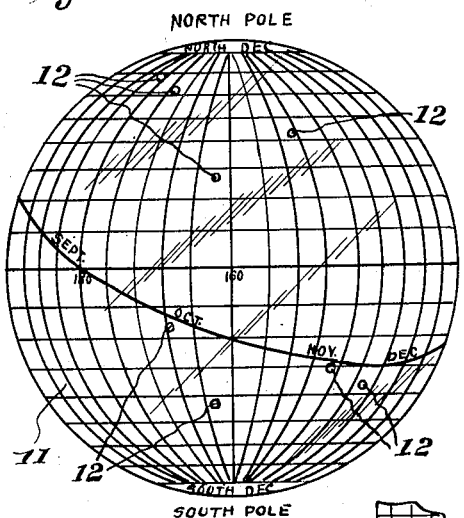
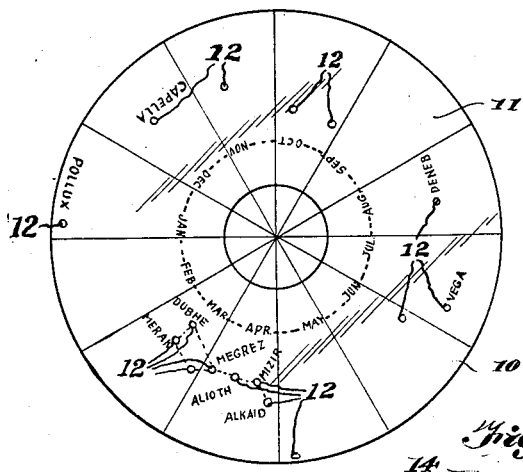
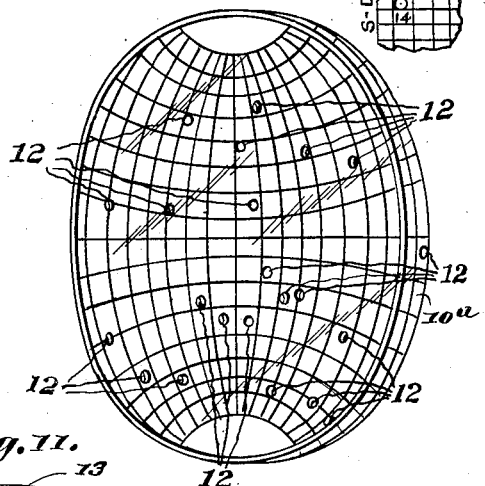

March 27, 1945.  F. H. HAGNER  2,372,487
STAR IDENTIFIER
Filed April 26, 1943  3 Sheets-Sheet 3
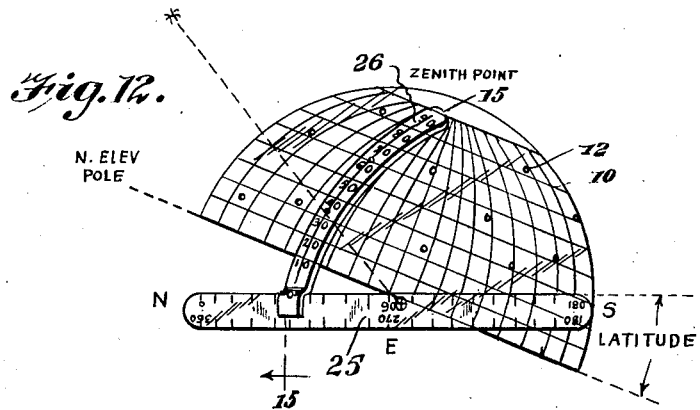
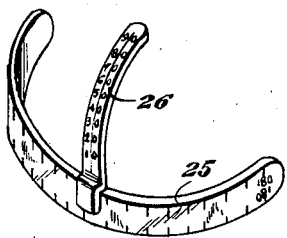
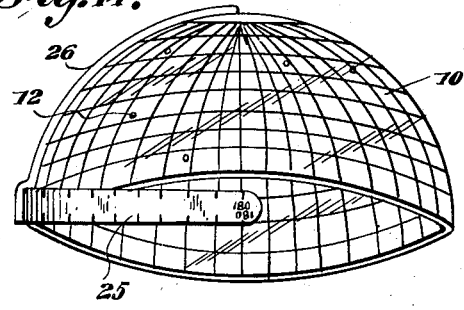
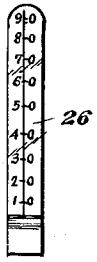
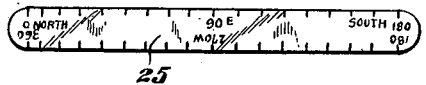
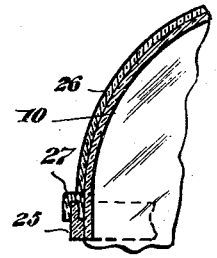
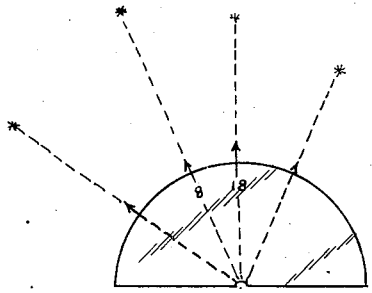
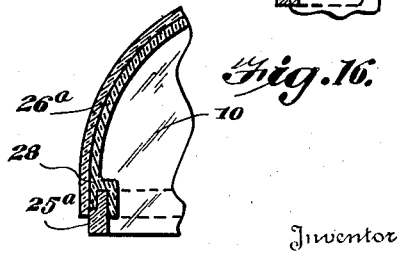
Inventor
FREDERICK H. HAGNER
By
Attorney Patented Mar. 27, 1945

2,372,487

UNITED STATES PATENT OFFICE 2,372,487

STAR IDENTIFIER

Frederick H. Hagner, San Antonio, Tex.

Application April 26, 1943, Serial No. 484,639

7 Claims. (Cl. 35—43)

This invention relates to a star identifier and has for one of its objects the production of a simple and efficient device for facilitating the identification of known, as well as unknown, stars and the like, by direct observation of the stars through a transparent semispherical gauge upon which gauge the proper positions of known navigational stars are indicated as to their correct declination and sidereal hour angle.

A further object of this invention is the production of a simple and efficient means for identifying stars and the like, wherein a transparent semispherical globe-like element is provided, upon which globe-like element the relative positions of known stars are indicated to facilitate identification of the stars to the eye of an observer as they appear in the heavens during their diurnal movement from east to west.

Other objects and advantages of the present invention will appear throughout the following specification and claims.

In the drawings—

Figure 1 is a perspective view of one form of the invention illustrating the device in use;

Figure 2 is a perspective view looking at the inside of the identifier;

Figure 3 is a vertical sectional view;

Figure 4 is a horizontal sectional view taken on line 4—4 of Figure 3;

Figure 5 is a plan view of the star identifier or gauge strip used with the present invention;

Figure 5a is a plan view of a modified form of the star-identifying strip;

Figure 6 is an elevational view of one semisphere globe;

Figure 7 is an elevational view of the other semisphere globe;

Figure 8 is a top plan view of the assembled semisphere globes;

Figure 9 is a perspective view of one semisphere globe illustrating the type of globe wherein the identifying strip is not used;

Figure 10 is a fragmentary perspective view of a portion of the globe, illustrating the identifying marking formed around the star-identifying apertures;

Figure 11 is an enlarged transverse sectional view taken on line 11—11 of Figure 10;

Figure 12 is a front elevational view of a semisphere shown in conjunction with the horizon band and altitude arc;

Figure 12a is a fragmentary side elevational view of a portion of one of the semispheres showing the manner in which the star-identifying means or apertures are identified by numbers;

Figure 13 is a perspective view of the horizon band and altitude arc;

Figure 14 is a side elevational view taken at right angles to Figure 12;

Figure 15 is a vertical sectional view taken on line 15—15 of Figure 12;

Figure 16 is a vertical sectional view similar to Figure 15 and illustrating a form of horizon band and altitude arc mounted inside the semisphere;

Figure 17 is a diagrammatic view illustrating the manner of using the semisphere for locating and identifying navigational stars;

Figure 18 is a front elevation of the altitude arc illustrating the graduations placed thereon;

Figure 19 is a plan view of the horizon band showing the graduations appearing thereon.

The star identifier consists of two halves of a transparent Plexiglas or other transparent sphere 10 and 11, corresponding to two halves of the celestial sphere, and divided so that 0 to 180° of sidereal hour angle from pole to pole is represented on one half and 180° to 360° is represented on the other, as shown in Figures 6 and 7. Around the center line of each of the semispheres, meridians are drawn at intervals of 10° as shown also in Figures 6 and 7. These last mentioned lines or meridians represent sidereal hour angle.

Each semisphere is provided with a plurality of star-locating apertures 12 which are drilled or cut in a direction converging toward the center of the semisphere. Some of these apertures 12 are large to designate stars of the first magnitude, and others are small to designate stars of the second magnitude. Each aperture 12 may be properly designated by name or number according to the names of the stars as they appear in the Nautical Almanac. These apertures 12 are properly located upon the semispheres 10 and 11 in accurate relation one to the other as the stars actually appear in the solar system. In other words, each aperture 12 corresponds to a navigational star, and is positioned according to that star's declination and sidereal hour angle, and its size is determined by the star's magnitude, the large aperture representing first magnitude stars, and slightly smaller apertures representing second magnitude stars, etc.

The area surrounding each aperture 12 is preferably painted adjacent the edge of the aperture with a black ring 13 in countersunk relation and a band of luminous paint 14 is formed around the outer edge of the black ring, both the ring 13 and band 14 being flush with the outer face of the semisphere. When holding one semisphere in the position, as shown in Figure 1, or at an angle to observe a star through one of the apertures 12, with the eye of the operator in the approximate center of the semisphere and at the same time locating a second star through another aperture, all of the navigational stars may then be identified through their respective apertures either by reference numbers or names. The luminous band formed around each aperture will facilitate the registration of the beam of light from an observed star and the locating or identifying aperture 12. The names of the stars or their reference numbers may be painted with luminous paint upon the semisphere adjacent the respective apertures.

There are several modified structures which may be used for carrying out the purposes of this invention, and these structural modifications will be described in the following:

In the form shown in Figure 1, one semisphere is shown indicated by the numeral 10 above referred to, and a star-identifying strip 15 is pivotally secured at the north and south poles 16 and 17 of the semisphere 10. This strip 15 is bowed to conform to the contour of the semisphere 10 and swings against the inner face of the semisphere 10 from edge to edge of the semisphere. The navigational stars are properly located upon the star-identifying strip 15, as indicated at 18, by a cross line at their correct angle and their reference numbers according to the Nautical Almanac are placed beside the cross lines. The cross lines and reference numbers are preferably of luminous paint which will glow in the dark and will facilitate their observation by the operator, and are arranged along the center line 18a—see Figure 5. A sighting strip 19 is secured at its ends to the ends of the identifying strip 15 and extends vertically as shown from pole to pole in line with the axes thereof. This sighting strip 19 is provided with a central sighting aperture 20 which is located at the exact center of the semisphere 10. The sighting strip 19 is fixed in any suitable manner to the ends of the identifying strip 15, and as the strip 15 swings around the inner face of the semisphere 10 the sighting strip 19 will rotate about the axis of the poles 16 and 17 thereby at all times keeping the sighting opening 20 in proper alignment with the inner face of the identifying strip 15.

As shown in Figure 5a, the identifying strip 15a may be graduated along the longitudinal central line from end to end running from the center at 0 to 90° toward the end.

It should be understood that in actual operation, one semisphere is held in front of the eye of an observer, in a position to see the navigational stars, which he may desire to identify, he then registers any two navigational stars with two of the apertures 12 and when these stars so register, the observer swings the identifying strip 15 so that the selected cross mark (+) on the strip passes over in registration with the selected apertures 12. When, for instance, the mark (11+) registers with a navigational star and one of the apertures 12, the observer will know that this is star number 11 in the Nautical Almanac. Then as the strip 15 is swung further to bring (22+) in line with a second navigational star and a second aperture 12, the observer will know that this star is star number 22 listed in the Nautical Almanac. By following this procedure, all of the navigational stars may be properly and accurately identified. The same result may be accomplished by using the graduated strip 15a which will locate the stars by their positions as to degrees marked on the strip 15a in place of the key-marks (11+, 22+, 7+, 5+, 21+, 6+, 13+, 14+, 19+, and 2+) as shown in Figure 5.

If desired, the identifying strips 15 and 15a, as well as the sighting strip 19 may be dispensed with, as these elements are optional equipment, and the apertures in the semisphere 10a numbered or named so that the proper navigating stars may be identified by the eye of the observer—see Figure 9.

As previously mentioned, each semisphere which is transparent is divided and graduated with lines spaced ten degrees apart and converging toward each pole. These lines represent sidereal hour angles, one globe having from 0 to 180° and the other from 180° to 360°. Cross lines at right angles to the above mentioned lines are also placed upon each semisphere. At the center of each semisphere is the celestial equator line which is zero, and other parallel lines are arranged upon each semisphere spaced ten degrees apart toward the opposite poles. These cross lines are known as north and south declination lines (circles). As shown in Figures 6 and 7 the sun's path marked with the months of the year may be indicated upon the semisphere.

In Figure 8 there is shown a diagram in which two semispheres are assembled having sidereal hour angle lines indicated, converging at the poles, and having certain navigational stars indicated thereon with the various months of the year also indicated thereon.

Each semisphere illustrated is intended to represent a spherical chart of the navigational stars in their correct relative positions, and the coordinates used in nautical astronomy. There are 55 navigational stars in the Nautical Almanac. Up to this time, all other methods of star identification presented a mathematical problem in order to find the local hour angle and latitude of the observer, as well as to correct Greenwich time, because of the fact that flat charts or flat graphs or flat surfaces have been used. The present invention, however, allows an observer to identify the navigational stars by matching the reference holes or identification means on the semisphere with any two navigational stars. These holes or identification means on the semisphere surface all converge toward the eye of the observer which is located at the approximate center and in line with the two poles of the semisphere.

It should be understood that the present device is an instrument which may be taken by an observer, a student, or a navigator, into the open in the dark at night, and he may grasp the instrument in his hands adjacent the edges of the instrument, with one eye at the approximate center between the two poles and in line therewith. The observer may then move the instrument until two bright stars in the heavens register with two of the apertures or indicating means formed upon the instrument or semisphere. The numbers or names of these stars will appear adjacent the identification means on the instrument and by recognizing these stars as a result of this identification means, the observer will be able to identify the stars in the heavens because of the fact that the instrument has been oriented or set to a pattern wherein by matching two navigational stars the other identifying means or apertures on the instrument will register with the other navigational stars. The observer may then merely hold the instrument in a steady position and by shifting his eye he will note that all other navigational stars appear in registration with the identifying means of the instrument.

In conjunction with this instrument above described in the nature of a semisphere, I use a means for determining the altitude and azimuth of the observed body—star—by direct observation by the observer through this transparent semisphere and a suitable horizon band and a suitable altitude arc. Note Figure 12.

An altitude indicating arc 26 is slidably mounted around the upper periphery of the curved horizon band 25, which band 25 extends in a level transverse position even with the eye. This altitude arc 26 is graduated in degrees from 0 at the base to 90° at its zenith point. This altitude arc by being moved from the center of the band 25 toward its ends in line with a beam of light from a selected star or other celestial body will give the proper altitude and azimuth of the observed body when viewed from the eye of the observer located at the approximate center of the semisphere 10 looking in the direction of a star or other celestial body, the azimuth reading being obtained by noting the position of the altitude arc 26 upon the scale formed upon the outer face of the horizon band 25.

The band 25 and the arc 26 are both formed of suitable transparent material and all markings thereon may be made with luminous paint to permit of a proper reading at night. The band 25 is graduated as shown in Figure 19, and the arc 26 is graduated as shown in Figure 18. The arc 26 may be slidably mounted in any manner upon the top edge of the band 25 such as is shown at 27 in Figure 15, when the device is used upon the outer face of the semisphere 10, or at 28 when the device is mounted for contact with the inner face of the semisphere 10. It should be understood that I do not desire to limit the present invention to the exact mechanical details of construction since this may be varied without departing from the spirit of the invention. Furthermore the elements for measurement may be varied as to graduation and marking and the star-identifying means may be a mark, an aperture, or any other means which may be placed upon the semisphere 10 to identify stars and the like. It should be further understood that where I refer in my description to the semisphere 10 this description equally applies to the semisphere 11 since the semisphere 10 contains indication of one group of navigation stars, and the semisphere 11 contains indications of the remaining group of stars.

In measuring the altitude and azimuth the transparent semisphere 10 is held in front of the face of the observer with the band 25 in a straight horizontal position, after the stars have been properly located in registration with the identifying means on the semisphere. The altitude arc 26 is then moved along the top edge of the band 25 until the illuminated center line on the altitude arc 26 registers with the star and the identifying means 12 on the semisphere. The distance from the horizon to the point of registration will give the altitude of the star, and the position of the altitude arc on the band 25 will give the azimuth. The distance between the upper edge of the bend 12 and the lower edge of the semisphere—note Figure 12, will give the polar distance of the observer, that is to say the distance between the pole and the horizon. This information enables the navigator to make use of these measurements to determine his approximate position relative to the observed body—star—the angle of which has just been measured.

This instrument permits a navigator to properly and accurately identify the desired star and then to use a sextent to accurately measure the proper star and not some other star. This avoids confusion and prevents the navigator from taking measurements from an incorrect star. In many instances because of the cloudy condition of the skies, it is impossible to observe a complete constellation of stars, but it often happens that at least two bright stars may be observed, and it would only be necessary to match the identification means of the instrument with two of these stars in order to accomplish the desired results and to identify these two stars by means of the identifying means upon the semisphere which has been used for this observation.

Having described the invention, what is claimed is:

1. A star identifier comprising a part-spherical transparent body provided with an open side having peripheral edges, star-locating elements carried by the transparent body and arranged in a pattern to match the location of navigatoinal stars in the heavens when the stars are viewed by an observer through said transparent body, the peripheral edges being adapted to be gripped by the hands of an operator to facilitate the holding of the transparent body in front of the face of the operator, and the pattern of locating elements being arranged in correct relative positions so that when any two elements match with two navigational stars, all other elements likewise match with the remaining navigational stars.

2. A star identifier comprising a part-spherical transparent body having star-locating elements carried thereby and arranged in a pattern to match the location of navigational stars in the heavens when the stars are viewed by an observer through said transparent body, the pattern of locating elements being arranged in correct relative positions so that when any two elements match with two navigational stars, all other elements likewise match with the remaining navigational stars, a sight-carrying means spanning the transparent body and said sight-carrying means having a sighting element located at the center of said sight-carrying means to facilitate the accurate placing of the star-locating elements in matched relation and in alignment with the navigational stars.

3. A star matching and identifying device comprising a transparent part-spherical hollow body having an open side with peripheral edges, the body being adapted to be gripped by the hands of an operator along the peripheral edges and adapted to be held in a position with the open side of the transparent body in front of the face of an operator, and the transparent body having selected navigational star-designating means located upon the transparent body in accurate relative location so that all of the selected navigational stars will be relatively located and matched with the star-designating means upon the transparent body when any two navigational stars are aligned with two selected star-designating means on the transparent body and the eye of the observer located adjacent the open side of the transparent body.

4. A star matching and identifying device comprising a transparent part-spherical hollow body having an open side with peripheral edges, the body being adapted to be gripped by the hands of an operator along the peripheral edges and adapted to be held in a position with the open side of the transparent body in front of the face of an operator, and the transparent body having selected navigational luminous star-designating means located upon the transparent body in accurate relative locations so that all of the selected navigational stars will be relatively located and matched with the star-designating means upon the transparent body when any two navigational stars are aligned with two selected star-designating means on the transparent body and the eye of the observer located adjacent the open side of the transparent body.

5. A star matching and identifying device comprising a transparent part-spherical hollow body having an open side with peripheral edges, the body being adapted to be gripped by the hands of an operator along the peripheral edges and adapted to be held in a position with the open side of the transparent body in front of the face of an operator, and the transparent body having apertures constituting selected navigational star-designating means located upon the transparent body in accurate relative locations so that all of the selected navigational stars will be relatively located and matched with the star-designating means upon the transparent body when any two navigational stars are aligned with two selected star-designating means on the transparent body and the eye of the observer located adjacent the open side of the transparent body.

6. A star matching and identifying device comprising a transparent part-spherical hollow body having an open side with peripheral edges, the body being adapted to be gripped by the hands of an operator along the peripheral edges and adapted to be held in a position with the open side of the transparent body in front of the face of an operator, the transparent body having apertures constituting selected navigational star-designating means located upon the transparent body in accurate relative locations so that all of the selected navigational stars will be relatively located and matched with the star-designating means upon the transparent body when any two navigational stars are aligned with two selected star-designating means on the transparent body and the eye of the observer located adjacent the open side of the transparent body, and a luminous indicating means surrounding each aperture to facilitate the matching of the designating means with the navigational stars at night.

7. A star matching and identifying device comprising a transparent part-spherical hollow body having an open side with peripheral edges, the body being adapted to be gripped by the hands of an operator along the peripheral edges and adapted to be held in a position with the open side of the transparent body in front of the face of an operator, the transparent body having selected navigational star-designating means located upon the transparent body in accurate relative locations so that all of the selected navigational stars will be relatively located and matched with the star-designating means upon the transparent body when any two navigational stars are aligned with two selected star-designating means on the transparent body and the eye of the observer located adjacent the open side of the transparent body, the transparent body having an axis, a star-identifying strip pivoted upon the axis conforming to and lying closely against the contour of the transparent body, individual star-identifying means located upon the identifying strip and adapted to be selectively brought into registration with the star-designating means for identifying the navigational stars matched with a selected star-designating means.

FREDERICK H. HAGNER.